United States Patent
Kannan et al.

(10) Patent No.: US 10,348,565 B2
(45) Date of Patent: Jul. 9, 2019

(54) SYSTEM AND METHOD FOR RULE-BASED ELASTICITY IN A MULTITENANT APPLICATION SERVER ENVIRONMENT

(71) Applicant: Oracle International Corporation, Redwood Shores, CA (US)

(72) Inventors: Mahesh Kannan, San Jose, CA (US); Rajendra Inamdar, North Chelmsford, MA (US); Michael Cico, Hampton, NH (US); Sandeep Shrivastava, Westford, NH (US); Anthony Vlatas, Brookline, NH (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 277 days.

(21) Appl. No.: 14/863,245

(22) Filed: Sep. 23, 2015

(65) Prior Publication Data
US 2016/0094635 A1 Mar. 31, 2016

Related U.S. Application Data

(60) Provisional application No. 62/055,571, filed on Sep. 25, 2014.

(51) Int. Cl.
*H04L 29/06* (2006.01)
*H04L 12/24* (2006.01)
(Continued)

(52) U.S. Cl.
CPC ........ *H04L 41/0869* (2013.01); *G06F 9/5077* (2013.01); *H04L 67/1025* (2013.01)

(58) Field of Classification Search
CPC ..... H04L 63/10; H04L 67/10; G06F 9/45533; G06F 3/0644; G06F 2009/45575
(Continued)

(56) References Cited

U.S. PATENT DOCUMENTS

| 8,326,876 B1 | 12/2012 | Venkataraman et al. |
| 2012/0072597 A1 | 3/2012 | Teather et al. |

(Continued)

FOREIGN PATENT DOCUMENTS

| CN | 101639835 | 2/2010 |
| CN | 102170457 | 8/2011 |

(Continued)

OTHER PUBLICATIONS

Chinese Patent Office, Office Action dated Jul. 20, 2018, 8 pages.

*Primary Examiner* — Adnan M Mirza
(74) *Attorney, Agent, or Firm* — Tucker Ellis LLP

(57) ABSTRACT

In accordance with an embodiment, described herein is a system and method rule-based elasticity support in an application server environment. The method can begin with providing, at one or more computers, including an application server environment executing thereon, a plurality of deployable resources which can be used within the application server environment, one or more partitions, an administration server, the administration server comprising a diagnostic framework, a rules framework, and an elastic service manager, and a dynamic cluster for use by the one or more partitions. The method can continue with monitoring, by the diagnostic framework, metrics associated with the one or more partition and the dynamic cluster. The method can then trigger, by the rules framework, the action based upon a comparison between one of the one or more rules and the monitored metrics associated with the one or more partitions and the dynamic cluster.

17 Claims, 10 Drawing Sheets

(51) Int. Cl.
*H04L 29/08* (2006.01)
*G06F 9/50* (2006.01)

(58) Field of Classification Search
USPC .......................................................... 709/203
See application file for complete search history.

(56) References Cited

U.S. PATENT DOCUMENTS

| | | | |
|---|---|---|---|
| 2014/0149980 A1* | 5/2014 | Vittal .................... | G06F 9/5072 718/1 |
| 2014/0331297 A1* | 11/2014 | Innes ...................... | H04L 63/08 726/7 |
| 2015/0207758 A1 | 7/2015 | Mordani et al. | |
| 2015/0370549 A1 | 12/2015 | Zhang et al. | |
| 2015/0370608 A1 | 12/2015 | Dipol et al. | |
| 2015/0372883 A1 | 12/2015 | Lam et al. | |
| 2015/0372887 A1 | 12/2015 | Inamdar et al. | |
| 2015/0372936 A1 | 12/2015 | Kasso et al. | |
| 2015/0372937 A1 | 12/2015 | Lai et al. | |
| 2015/0373004 A1 | 12/2015 | Hopkins et al. | |
| 2015/0373097 A1 | 12/2015 | Konkus et al. | |
| 2015/0373098 A1 | 12/2015 | Mordani et al. | |
| 2015/0373099 A1 | 12/2015 | Dipol et al. | |
| 2015/0373117 A1 | 12/2015 | Gleyzer et al. | |
| 2015/0378641 A1 | 12/2015 | Patel et al. | |
| 2015/0378938 A1 | 12/2015 | Patel et al. | |
| 2016/0013983 A1 | 1/2016 | Lu et al. | |
| 2016/0014038 A1 | 1/2016 | Thyagarajan et al. | |
| 2016/0014191 A1 | 1/2016 | Liu et al. | |
| 2016/0014212 A1 | 1/2016 | Zhang et al. | |
| 2016/0020949 A1 | 1/2016 | Mares et al. | |
| 2016/0057041 A1* | 2/2016 | Gupta .................... | H04L 41/16 706/12 |
| 2016/0085543 A1 | 3/2016 | Islam et al. | |
| 2016/0088108 A1 | 3/2016 | Felts et al. | |
| 2016/0092278 A1 | 3/2016 | Quinn et al. | |
| 2016/0092319 A1 | 3/2016 | Parkinson et al. | |
| 2016/0092342 A1 | 3/2016 | Inamdar et al. | |
| 2016/0094385 A1 | 3/2016 | Bower et al. | |
| 2016/0094403 A1 | 3/2016 | Somogyi et al. | |
| 2016/0094404 A1 | 3/2016 | Kasso et al. | |
| 2016/0094405 A1 | 3/2016 | Barnes et al. | |
| 2016/0094406 A1 | 3/2016 | Phan et al. | |
| 2016/0094407 A1 | 3/2016 | Parkinson et al. | |
| 2016/0094408 A1 | 3/2016 | Segu | |
| 2016/0094473 A1 | 3/2016 | Mordani et al. | |
| 2016/0094474 A1 | 3/2016 | Sahoo et al. | |
| 2016/0094478 A1 | 3/2016 | Quinn et al. | |
| 2016/0094484 A1 | 3/2016 | Mordani et al. | |
| 2016/0094486 A1 | 3/2016 | Sahoo et al. | |
| 2016/0094498 A1 | 3/2016 | Xiao et al. | |
| 2016/0094510 A1 | 3/2016 | Xiao et al. | |
| 2016/0094582 A1 | 3/2016 | Watson et al. | |
| 2016/0094583 A1 | 3/2016 | Bower | |
| 2016/0094624 A1 | 3/2016 | Mordani et al. | |
| 2016/0094625 A1 | 3/2016 | Sengodan et al. | |
| 2016/0094626 A1 | 3/2016 | Bajaj et al. | |
| 2016/0094627 A1 | 3/2016 | Subramanyam et al. | |
| 2016/0094647 A1 | 3/2016 | Mordani et al. | |
| 2016/0142506 A1 | 5/2016 | Sahoo et al. | |
| 2016/0231998 A1 | 8/2016 | Islam et al. | |
| 2016/0328268 A1 | 11/2016 | Islam et al. | |
| 2017/0017494 A1 | 1/2017 | Patel et al. | |
| 2017/0019467 A1 | 1/2017 | Inamdar et al. | |
| 2017/0019485 A1 | 1/2017 | Dorr et al. | |
| 2017/0034071 A1 | 2/2017 | Sidde et al. | |
| 2017/0116041 A1 | 4/2017 | Nanjudaswamy | |
| 2017/0118137 A1 | 4/2017 | Nanjudaswamy | |
| 2017/0126742 A1 | 5/2017 | Hopkins et al. | |
| 2017/0192772 A1 | 7/2017 | Islam et al. | |

FOREIGN PATENT DOCUMENTS

| | | |
|---|---|---|
| CN | 102333115 | 1/2012 |
| CN | 102571821 | 7/2012 |
| CN | 102571916 | 7/2012 |
| CN | 102609271 | 7/2012 |
| CN | 102932404 | 2/2013 |
| CN | 102932405 | 2/2013 |
| CN | 103455512 | 12/2013 |

* cited by examiner

SYSTEM AND METHOD FOR RULE-BASED ELASTICITY IN A MULTITENANT APPLICATION SERVER ENVIRONMENT

CLAIM OF PRIORITY AND CROSS-REFERENCE TO RELATED APPLICATIONS

This application claims the benefit of priority to U.S. Provisional Application titled "SYSTEM AND METHOD FOR RULE-BASED ELASTICITY IN A MULTITENANT APPLICATION SERVER ENVIRONMENT", Application No. 62/055,571, filed Sep. 25, 2014; and is related to U.S. Patent Application titled "SYSTEM AND METHOD FOR SUPPORTING MULTITENANCY IN AN APPLICATION SERVER, CLOUD, OR OTHER ENVIRONMENT", application Ser. No. 14/601,883, filed Jan. 21, 2015; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and cloud environments, and are particularly related to a system and method for rule-based elasticity in a multitenant application server environment.

BACKGROUND

Application servers generally provide a managed environment within which software applications can be deployed and run. Cloud-based environments allow applications to run within and take advantage of the distributed resources provided by a cloud. Such environments can support large numbers of users or tenants, some of which may have specific requirements that are particular to that user or tenant.

SUMMARY

In accordance with an embodiment, described herein is a system and method rule-based elasticity support in an application server environment. The method can begin with providing, at one or more computers, including an application server environment executing thereon, a plurality of deployable resources which can be used within the application server environment, one or more partitions, an administration server, the administration server comprising a diagnostic framework, a rules framework, an elastic service manager, and a dynamic cluster for use by the one or more partitions. The method can continue with monitoring, by the diagnostic framework, metrics associated with the one or more partitions and the dynamic cluster. The method can then trigger, by the rules framework, the action based upon a comparison between one of the one or more rules and the monitored metrics associated with the one or more partitions and the dynamic cluster.

DETAILED DESCRIPTION

In accordance with an embodiment, described herein is a system and method rule-based elasticity support in an application server environment. The method can begin with providing, at one or more computers, including an application server environment executing thereon, a plurality of deployable resources which can be used within the application server environment, one or more partitions, an administration server, the administration server comprising a diagnostic framework, a rules framework, and an elastic service manager, and a dynamic cluster for use by the one or more partitions. The method can continue with monitoring, by the diagnostic framework, metrics associated with the one or more partitions and the dynamic cluster. The method can then trigger, by the rules framework, the action based upon a comparison between one of the one or more rules and the monitored metrics associated with the one or more partitions and the dynamic cluster.

Application Server (e.g., Multi-Tenant, MT) Environment

Figure 1:
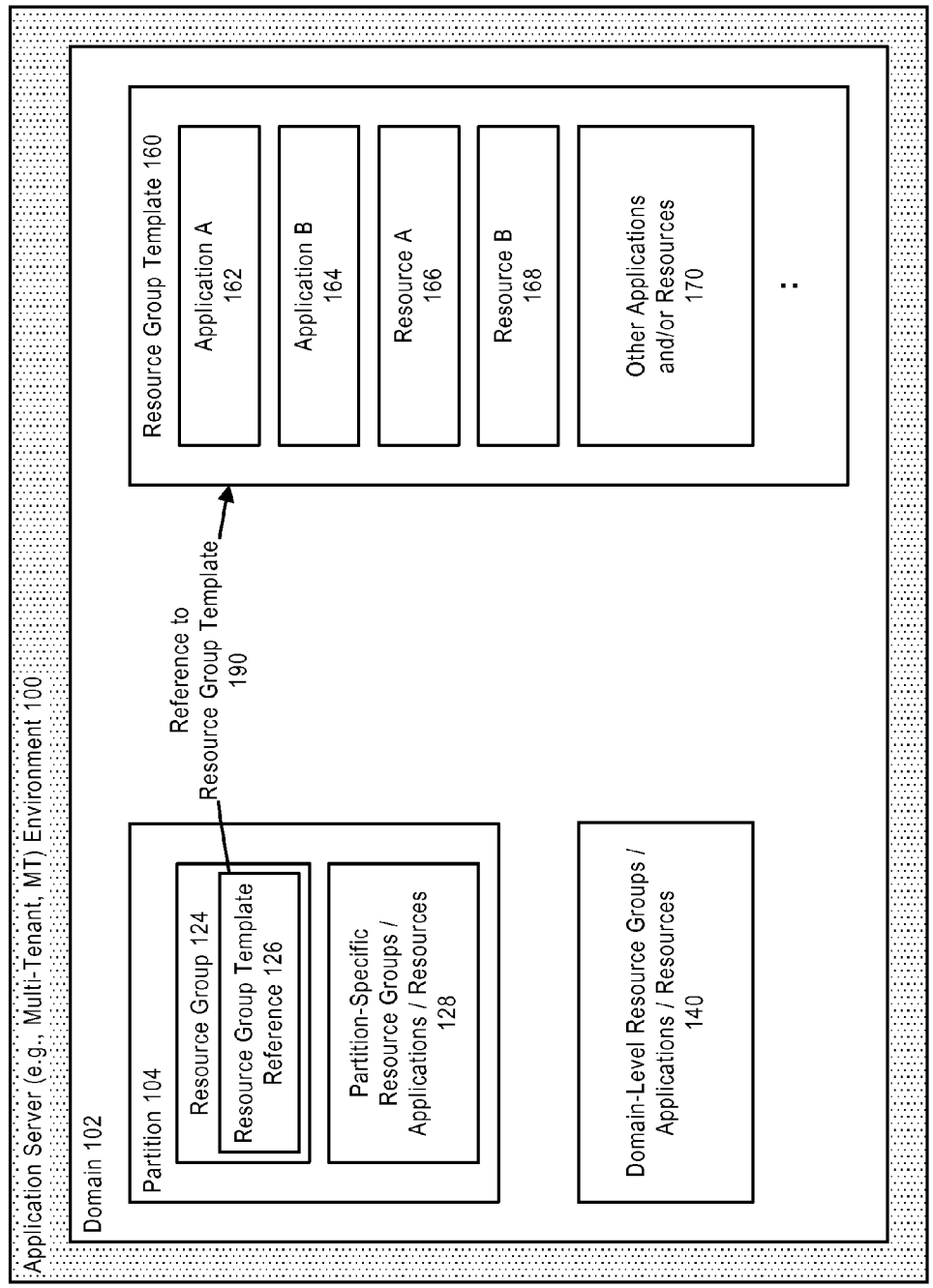
FIG. 1 illustrates a system for supporting multi-tenancy in an application server, cloud, or other environment, in accordance with an embodiment.

FIG. 1 illustrates a system for supporting multi-tenancy in an application server, cloud, or other environment, in accordance with an embodiment.

As illustrated in FIG. 1, in accordance with an embodiment, an application server (e.g., multi-tenant, MT) environment 100, or other computing environment which enables the deployment and execution of software applications, can be configured to include and operate according to a domain 102 configuration that is used at runtime to define an application server domain.

In accordance with an embodiment, the application server can include one or more partitions 104 that are defined for use at runtime. Each partition can be associated with a globally unique partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
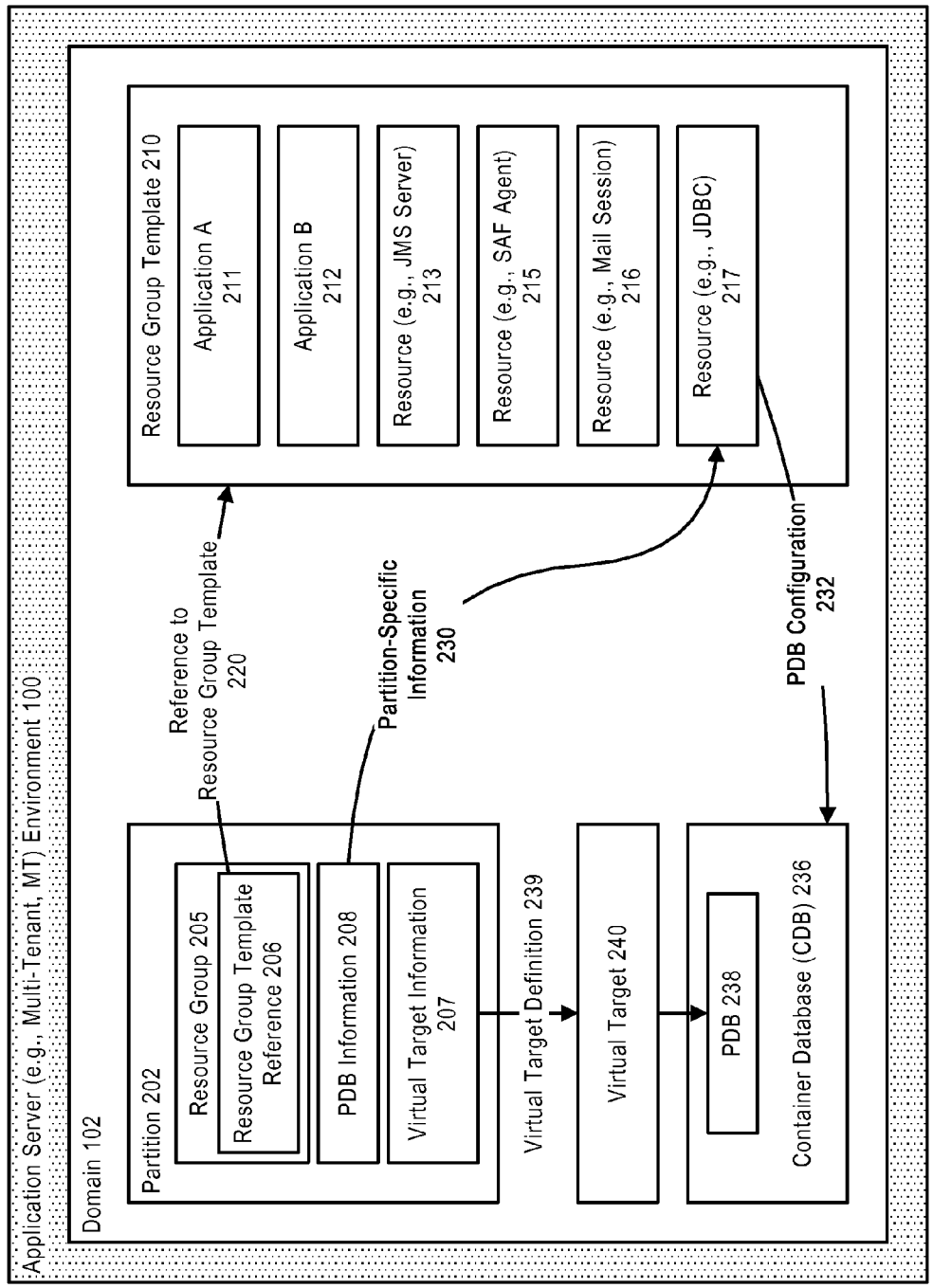
FIG. 2 further illustrates a system for supporting multi-tenancy in an application server, cloud, or other environment, in accordance with an embodiment.

FIG. 2 further illustrates a system for supporting multi-tenancy in an application server, cloud, or other environment, in accordance with an embodiment.

As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217.

The resource group template illustrated in FIG. 2 is provided by way of example; in accordance with other embodiments, different types of resource group templates and elements can be provided.

In accordance with an embodiment, when a resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, for use by that partition.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., http://baylandurgentcare.com.

Figure 3:
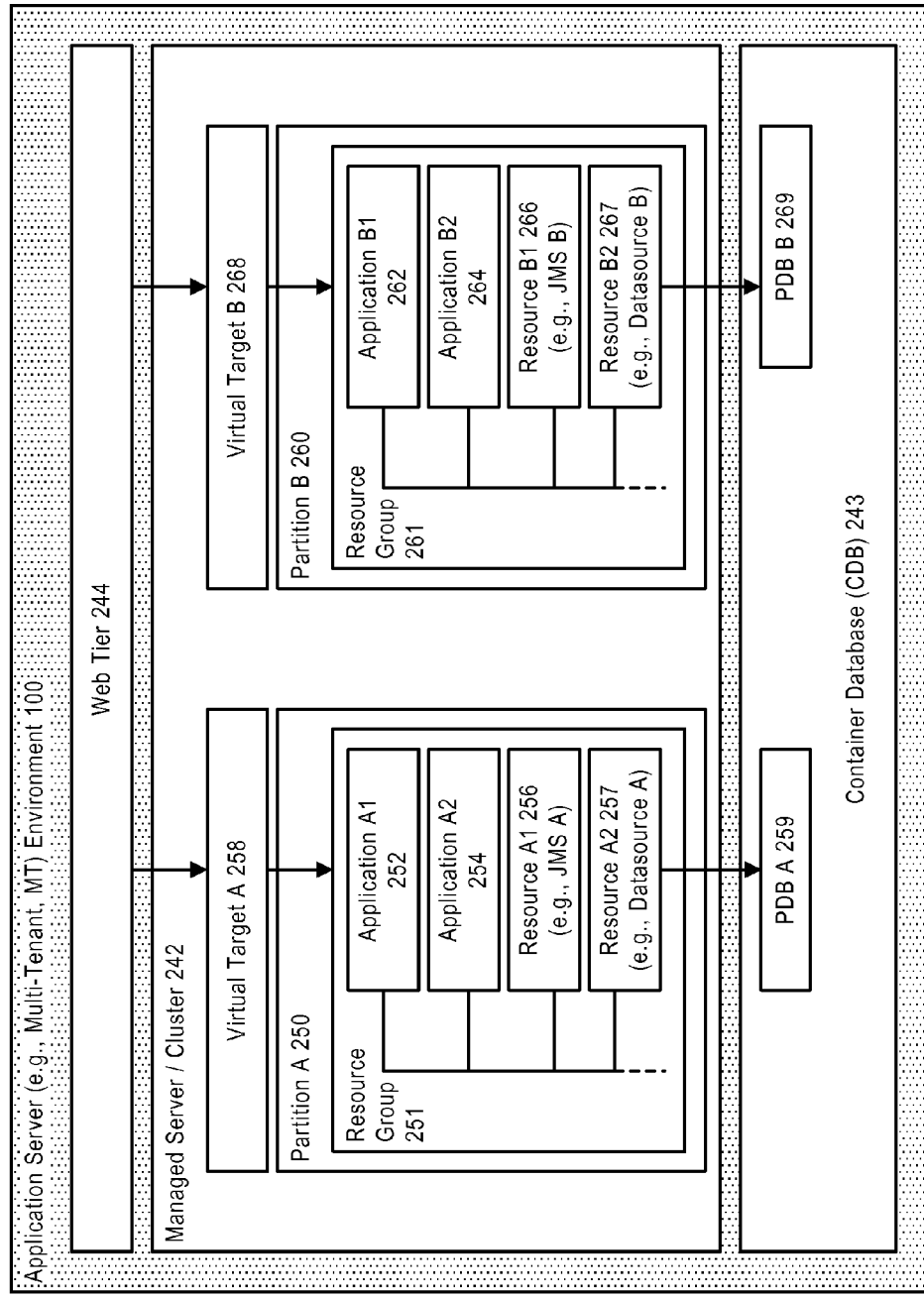
FIG. 3 further illustrates a system for supporting multi-tenancy in an application server, cloud, or other environment, in accordance with an embodiment.

FIG. 3 further illustrates a system for supporting multi-tenancy in an application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Resources

In accordance with an embodiment, a resource is a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates.

Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for an application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a SaaS use case, various partition-level resource groups can refer to domain-level resource group templates; while in a PaaS use case, partition-level resource groups can be created that do not refer to resource group templates, but instead represent applications and their related resources that are to be made available within that partition only.

In accordance with an embodiment, resource grouping can be used to group together applications and the resources they use as a distinct administrative unit within the domain. For example, in the medical records (MedRec) application described below, a resource grouping defines the MedRec application and its resources. Multiple partitions can run the same MedRec resource group, each using a partition-specific configuration information, such that the applications that are part of each MedRec instance are made specific to each partition.

Resource Group Templates

In accordance with an embodiment, a resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level—partition level configuration can instead be specified in the resource group template through the use of macros, or property name/value pairs.

In accordance with an embodiment, a particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${CRMDataUsername}.

Tenants

In accordance with an embodiment, in a multi-tenant environment, such as a multi-tenant (MT) application server environment, a tenant is an entity that can be represented by, or otherwise associated with, one or more partitions and/or one or more tenant-aware applications.

For example, tenants can represent distinct user organizations, such as different external companies, or different departments within a particular enterprise (e.g., HR and Finance departments), each of which can be associated with a different partition. A tenant globally unique identity (tenant ID) is the association of a particular user, at a particular moment in time, with a particular tenant. The system can derive which tenant a particular user belongs to from the user identity, for example by referring to a user identity store. The user identity enables the system to enforce those actions that a user is authorized to perform, including, but not limited to, which tenant the user may belong.

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant refer only to resources associated with that tenant, and not to resources associated with other tenants.

In accordance with an embodiment, a tenant-unaware application is one that contains no logic dealing with tenants explicitly, such that any resources that the application uses may be accessible regardless of what user submitted a request to which the application is responding. In contrast, a tenant-aware application includes logic that explicitly deals with tenants. For example, based on a user's identity the application can derive the tenant to which the user belongs and use that information to access tenant-specific resources.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

For example, the MedRec application, which supports a single doctor's office or hospital, can be exposed to two different partitions or tenants, e.g., a Bayland Urgent Care tenant, and a Valley Health tenant, each of which is able to access separate tenant-specific resources, such as separate PDBs, without changing the underlying application code.

Exemplary Domain Configuration and Multi-Tenant Environment

In accordance with an embodiment, applications can be deployed to a resource group template at the domain level, or to a resource group that is scoped to a partition or scoped to the domain. Application configuration can be overridden using deployment plans specified per-application, or per-partition. Deployment plans can also be specified as part of a resource group.

Figure 4:
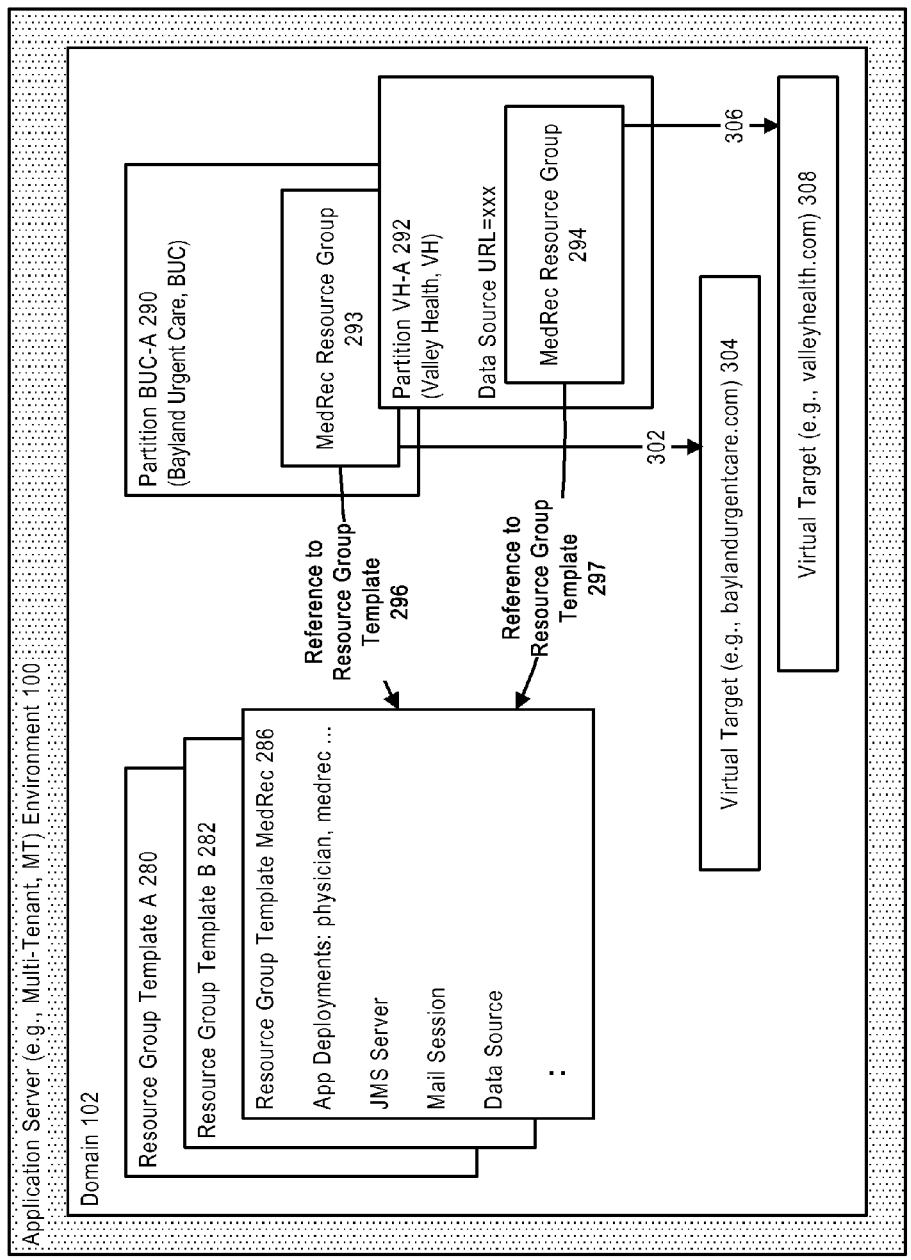
FIG. 4 illustrates a domain configuration for use with an exemplary multi-tenant environment, in accordance with an embodiment.

FIG. 4 illustrates a domain configuration for use with an exemplary multi-tenant environment, in accordance with an embodiment.

In accordance with an embodiment, when the system starts a partition, it creates virtual targets (e.g., virtual hosts) and connection pools, including one for each partition, to respective database instances, according to the provided configuration.

Typically, each resource group template can include one or more related applications and the resources on which those applications depend. Each partition can provide configuration data that is not specified in the resource group templates to which it refers, by providing a binding of the deployable resources in resource group templates to specific values associated with the partition; including, in some cases, overriding certain configuration information specified by the resource group template. This enables the system to activate an application represented by a resource group template differently for each partition, using the property values each partition has defined.

In some instances, a partition may contain resource groups that do not refer to resource group templates, or that directly define their own partition-scoped deployable resources. Applications and data sources that are defined within a partition are generally available only to that partition. Resources can be deployed so that they can be accessed from across partitions using partition: <partitionName>/<resource JNDI name>, or domain: <resource JNDI name>.

For example, a MedRec application can include a plurality of Java applications, a data source, a JMS server, and a mail session. To run the MedRec application for multiple tenants, the system administrator can define a single MedRec resource group template 286, declaring those deployable resources in the template.

In contrast to domain-level deployable resources, the deployable resources declared in a resource group template may not be fully configured in the template, or cannot be activated as-is, since they lack some configuration information.

For example, the MedRec resource group template may declare a data source used by the applications, but it may not specify a URL for connecting to the database. Partitions associated with different tenants, for example, partition BUC-A 290 (Bayland Urgent Care, BUC) and partition VH-A 292 (Valley Health, VH) can reference one or more resource group templates, by each including a MedRec resource group 293, 294 that references 296, 297 the MedRec resource group template. The reference can then be used to create 302, 306, the virtual targets/virtual hosts for each tenant, including a virtual host baylandurgentcare.com 304 associated with the BUC-A partition, for use by the Bayland Urgent Care tenant; and a virtual host valleyhealth.com 308 associated with the VH-A partition, for use by the Valley Health tenant.

Figure 5:
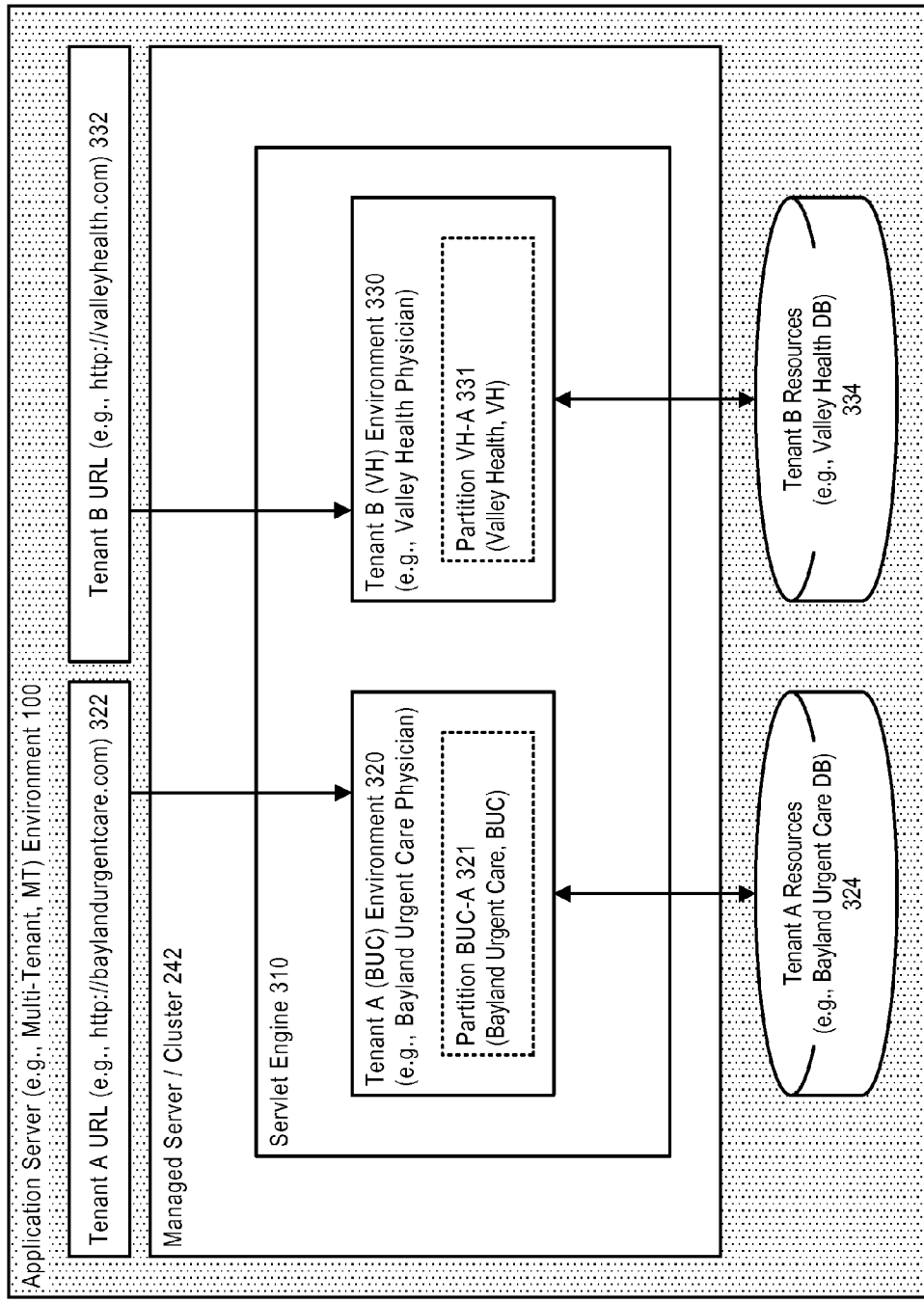
FIG. 5 further illustrates an exemplary multi-tenant environment, in accordance with an embodiment.

FIG. 5 further illustrates an exemplary multi-tenant environment, in accordance with an embodiment. As illustrated in FIG. 5, and continuing the example from above, in which two partitions reference the MedRec resource group template, in accordance with an embodiment, a servlet engine 310 can be used to support a plurality of tenant environments, in this example a Bayland Urgent Care Physician tenant environment 320, and a Valley Health Physician tenant environment 330.

In accordance with an embodiment, each partition 321, 331 can define a different virtual target on which to accept incoming traffic for that tenant environment, and a different URL 322, 332 for connecting to the partition and to its resources 324, 334, including in this example either a bayland urgent care database, or a valley health database respectively. The database instances can use compatible schemas, since the same application code will execute against both databases. When the system starts the partitions, it can create the virtual targets and connection pools to the respective database instances.

Rule-Based Elasticity

In accordance with an embodiment, an application server environment, such as a multitenant (MT) application server environment, can contain a cluster of servers which can include a number of managed servers running simultaneous and working together. By providing a cluster of managed servers, increased scalability as well as reliability can result. Additionally, having such a cluster of multiple manager servers running within the application server environment, can allow for increased performance, since, for example, partitions within an MT application server environment can call upon the server resources when needed.

However, with the increase in computing power needed to run current applications, even with multiple managed servers running within an application server environment, latency and poor performance can still occur when there are insufficient managed servers for the partitions to use. Additionally, it may be that the MT application server environment is over-populated with running servers, thus leading to a waste of compute resources. When these, or other situations occur, it is desirable to allow for a rule-based elasticity framework to provide for automatic scaling, either scaling up or scaling down, of the cluster of managed servers.

In accordance with an embodiment, a dynamic cluster can be included within an MT application server environment. The dynamic cluster contains multiple managed servers that are based on a server template, instead of being created by individual server configuration. For example, a dynamic cluster can contain multiple managed servers that are based on a single server template. This server template can form the basis for all the servers in the dynamic cluster so that each server does not need to be manually configured when expanding the cluster. However, there are still certain aspects of a managed server than can be individually configured.

In accordance with an embodiment, rule-based elasticity can allow for the implementation pre-existing or custom created policies by a domain administrator (also referred to herein variously as system administrator or global administrator) that can allow for automatic scaling operations of a dynamic cluster. A policy, in certain embodiments, can comprise a rule associated with an action. Once a policy has been triggered, it can provide for the automatic implementation of a scaling action at a targeted dynamic cluster. A managed server that is turned-on or created in the dynamic cluster can be based upon a server template. When additional server capacity is needed, a new managed server can be added (e.g., turned-on or created) to the dynamic cluster without having to first manually configure the new managed server. An administrator does not have to manually configure managed servers.

In addition to scaling dynamic clusters, rule-based elasticity can also be applied to other mechanisms within an application server environment. For example, a policy can be created to monitor partition-level traffic and, based upon a rule associated with the policy, adjust a work manager associated with the application server environment to either increase or decrease the threads allocated to a specific partition. In addition, rule-based elasticity can, on a more limited basis, be made available to partition administrators in order to allow partition administrators to monitor and configure their respective partitions according to selected or customized policies.

In accordance with an embodiment, an elasticity framework can be provided which can run various rules which can be selected or created by domain administrators, such as domain/global administrators. The elasticity framework can, in an example, leverage the watch/notifications provided by a diagnostic framework, such as WebLogic Diagnostic Framework (WLDF). WLDF system resources can be targeted to servers and/or clusters, such as managed servers running within a dynamic cluster. The watch rules associated with WLDF can be run within an administration server. The watch rules can be configured to use a variety of data points, such as runtime metrics from server and domain runtime MBean servers as well as log records and instrumentation events. Rule expression can use EL (expression language) syntax and when evaluated, return a Boolean value. The rules can be evaluated at configured schedules (calendar) while using metrics data. Rules based on log data can be evaluated as log records are generated. A number of actions can be associated with each watch rule. When a rule evaluates to true (Boolean value), an associated action, or actions, can be executed. Such actions can be provided by WLDF or by the elasticity framework. Actions provided by the elasticity framework can include, but are not limited to, scaling and tuning operations, which can be used to respond to changes in capacity needs.

A resource consumption management policy can provide additional metrics for monitoring purposes. Various other watch rules can be configured to account for these additional metrics provided by the resource consumption management policy.

In accordance with an embodiment, the elasticity framework can additionally provide interceptors that can provide hooks for other components of the system (e.g., Oracle Traffic Director, Database, etc.) to intercept a scaling operation so that they can prepare for, and react to (and potentially veto) the scaling operation if necessary.

Rule-Based Elasticity—Scaling Operations

Figure 6:
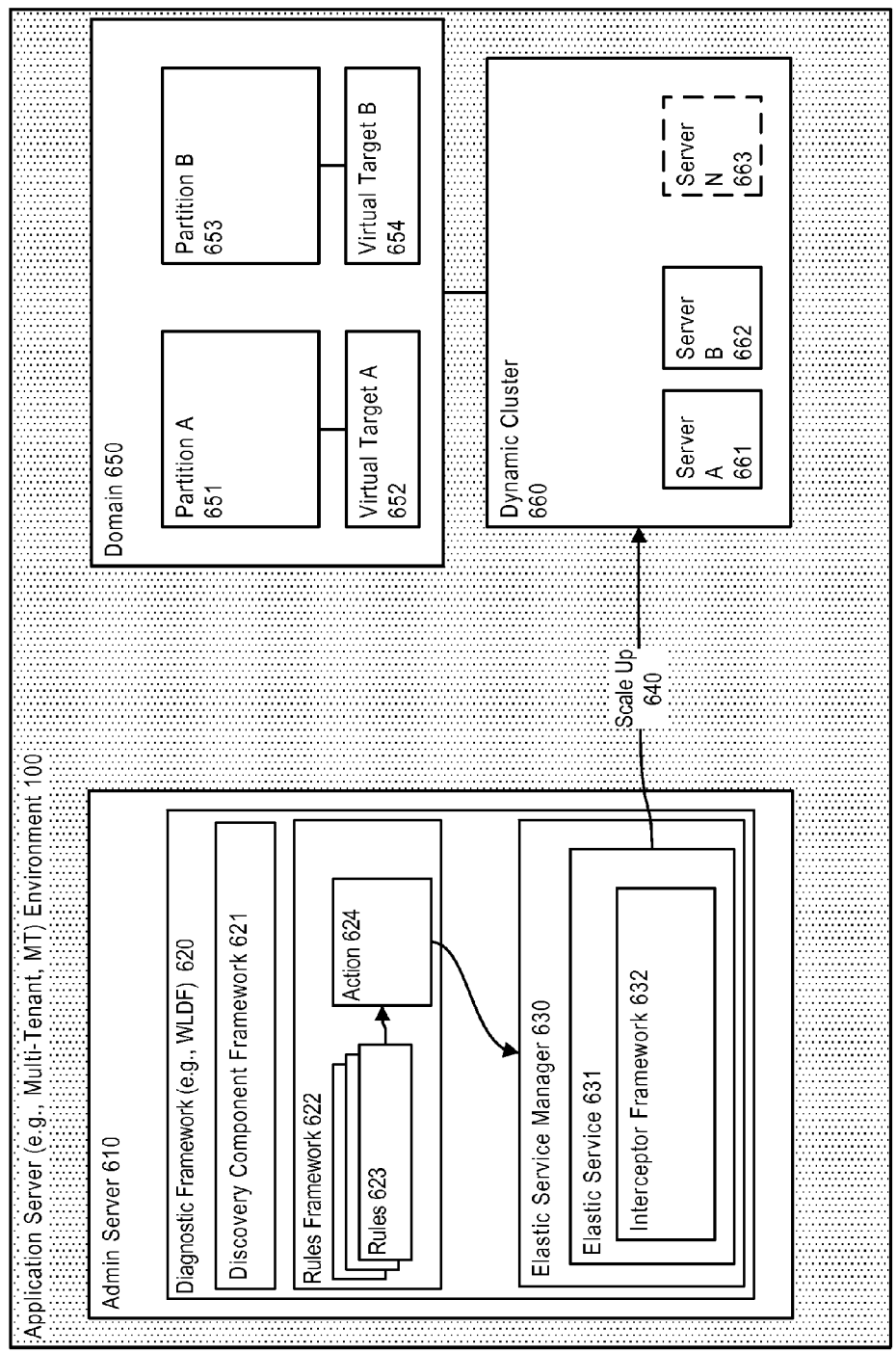
FIG. 6 illustrates rule-based elasticity within an application server environment, in accordance with an embodiment.

FIG. 6 illustrates rule-based elasticity within an application server environment, in accordance with an embodiment. More particularly, FIG. 6 illustrates a scaling operation performed on a dynamic cluster, based upon rule-based elasticity, within an application server environment. As shown in the Figure, an application server environment 600, such as a multitenant application server environment, can include an administration server 610, a domain 650, and a dynamic cluster 660. The administration server 610 can include a diagnostic framework 620. In accordance with an embodiment, the diagnostic framework can be a WebLogic Diagnostic Framework (WLDF). The diagnostic framework 620 can include a discovery component framework 621 (e.g., an Mbean discovery component framework, an action discovery component framework, and the like), a rules framework 622, and an elastic service manager 630. The rules framework 622 can include a number of rules 623 and an action module 624. The elastic service manager 630 can include an elastic service 631, which in turn can include an interceptor framework 632. The domain 650 can include partitions A and B, 651 and 653 respectively. Partitions A and B can be, respectively, associated with virtual targets A and B, 652 and 654 respectively. The dynamic cluster 660 can include a number of running managed servers, such as managed server A 661 and managed server B 662. In addition, the dynamic cluster can include a number of non-running managed serves, represented in the figure by managed server N 663.

In accordance with an embodiment, the diagnostic framework can contain, among the rules 623, watch rules associated with the diagnostic framework that can be run within the administration server 610. The watch rules can be configured to use a variety of data points, such as runtime metrics from server and domain runtime MBean servers as well as log records and instrumentation events. Rule expression can use EL (expression language) syntax and when evaluated, return a Boolean value. When a true value is returned by the rules 623, an associated action 624 can be triggered. The triggered action 624 can be associated with the elastic service manager in certain situations, and in turn the elastic service 631, such as when the triggered action is a scaling operation in the dynamic cluster 660.

For example, as depicted in FIG. 6, the diagnostic framework can, via watch rules, determine that the resources provided by the dynamic cluster (e.g., heap, threads) are insufficient to provide adequate service to the partitions within the domain (e.g., both partition A and partition B are placing heavy loads on the dynamic cluster). In such situation, the watch rule returns a value of true, and the associated action is a scale up operation. The scale up operation is then triggered within the elastic service manager, which provides the scale up elastic service. The scale up operation 640 is then triggered at the dynamic cluster, which can start managed server N.

In accordance with an embodiment, the discovery component framework can discover action services at runtime. The watch and notification configuration can also use the discovery component framework to obtain an instance of the service associated with an action type.

In accordance with an embodiment, the rules 623 can contain other types of rules in addition to watch rules. These other types of rules include, but are not limited to, smart rules and watch rules.

In accordance with an embodiment, smart rules can be pre-packaged predicates having a number of configurable parameters. Smart rules can allow an end user to create a watch rule by just specifying the values for these configurable parameters. A smart rule can be a function that return a Boolean. This can allow the function to be used as a predicate within an expression, either by itself or as a node within a more complex expression. When a method is identified as a smart rule, the rule can be an indicator to the framework and expression writers (through tools and documentation) that it encapsulates a more complex set of domain-specific knowledge. This can then be used as a standalone predicate within a watch rule expression.

For example, a simple function that computes the percentage of values within a vector that exceed a threshold would typically not be considered a smart rule; however, a rule that computes if the average JMS message backlog across a cluster over a period of time exceeds some threshold could be considered a smart rule.

In accordance with an embodiment, smart rules can further be flagged or highlighted within an expression editor (e.g., via a user interface), or identified separately from a command-line tool, such as WLST (WebLogic Scripting Tool).

As an example, in accordance with an embodiment, a smart rule can be written to compare an average free heap across a cluster at a periodic interval (e.g., 30 seconds), over a period of time (e.g., 5 minutes), in order to determine if more than a certain percentage of nodes (e.g., 75% of nodes) in a cluster are below an average heap free percentage threshold (e.g., 25%). The below function is an example of such a smart rule:

lowFreeHeap("cluster1","30s","5m",25,0.75)

In accordance with an embodiment, in situations where the above function returns a Boolean value of true, the constraint could be considered violated, and the elasticity framework could be invoked (i.e., the action associated with the rule) to scale up the dynamic cluster.

Similarly, in accordance with an embodiment, a scale-down smart rule could be written to look at the number of idle threads across the cluster, and return true if an average number of idle threads exceeds (as a percentage of the total number of execute threads), exceeds a threshold for a certain percentage of the nodes in the cluster (e.g., 75%). The below function is an example of such a smart rule:

highIdleThreadsPercentage("cluster1","30s","5m",75, 0.75)

In accordance with an embodiment, in situations where the above function returns a Boolean value of true, the constraint could be considered violated, and the elasticity framework could be invoked (i.e., the action associated with the rule) to scale down the dynamic cluster.

In accordance with an embodiment, calendar rules can be watch rule expressions that can be triggered according to a calendar schedule (e.g., at a specific time, after a duration of time, or at timed intervals). For example, a calendar rule can provide a schedule (e.g., check every weekday at 5:00 PM) for checking thread utilization among partitions each day at a specific time when it is known that the partitions generally utilize more threads than usual (signifying, for example, a peak load time).

Figure 7:
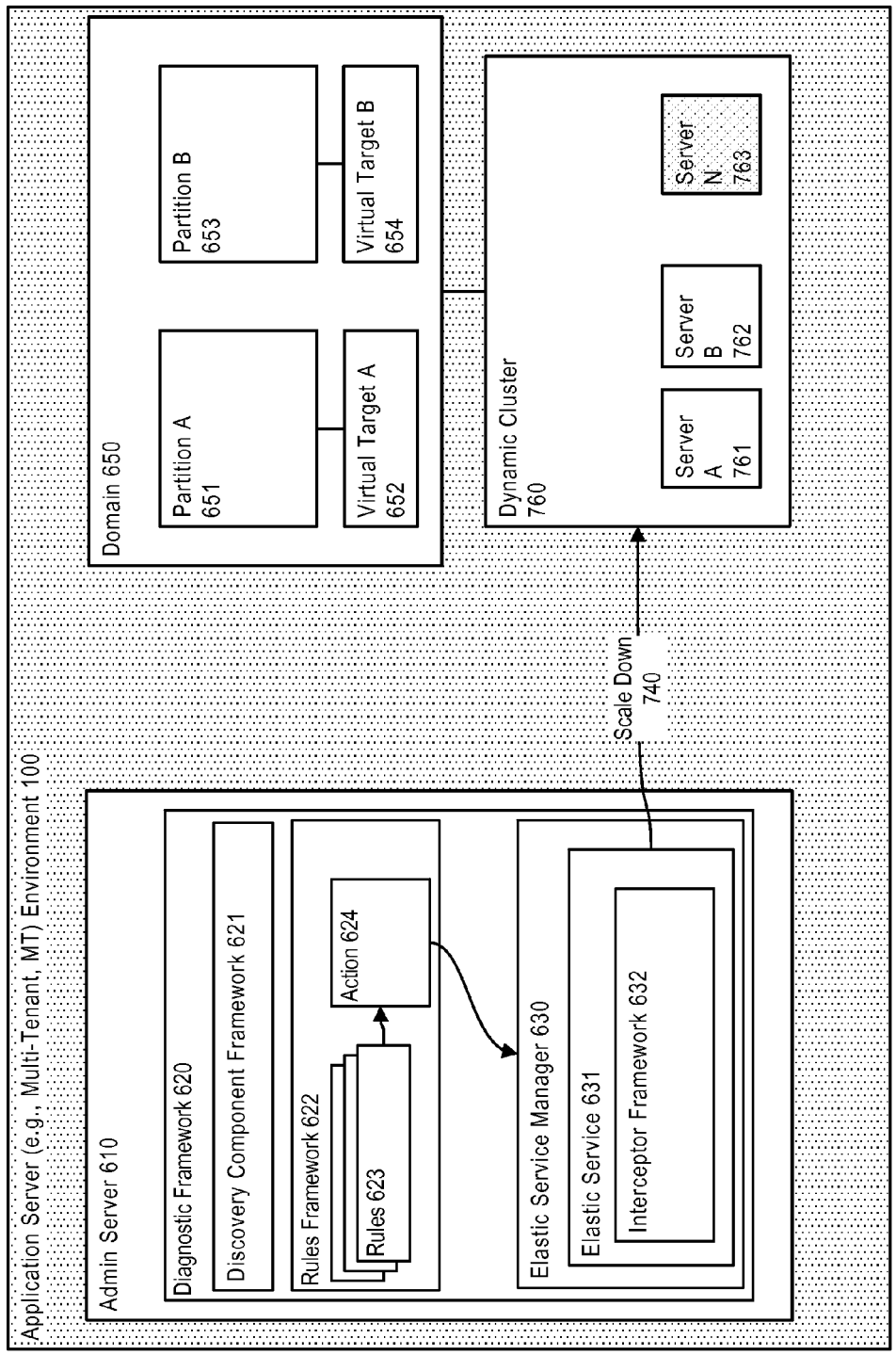
FIG. 7 illustrates rule-based elasticity within an application server environment, in accordance with an embodiment.

FIG. 7 illustrates rule-based elasticity within an application server environment, in accordance with an embodiment. More particularly, FIG. 7 illustrates a scaling operation performed on a dynamic cluster, based upon rule-based elasticity, within an application server environment. As shown in the Figure, an application server environment 600, such as a multitenant application server environment, can include an administration server 610, a domain 650, and a dynamic cluster 760. The administration server 610 can include a diagnostic framework 620. In accordance with an embodiment, the diagnostic framework can be a WebLogic Diagnostic Framework. The diagnostic framework 620 can include a discovery component framework 621, a rules framework 622, and an elastic service manager 630. The rules framework 622 can include a number of rules 623 and an action module 624. The elastic service manager 630 can include an elastic service 631, which in turn can include an interceptor framework 632. The domain 650 can include partitions A and B, 651 and 653 respectively. Partitions A and B can be, respectively, associated with virtual targets A and B, 652 and 654 respectively. The dynamic cluster 760 can include a number of running managed servers, such as managed server A 761, managed server B 762, and managed server N 763.

In accordance with an embodiment, the diagnostic framework can contain, among the rules 623, watch rules associated with the diagnostic framework that can be run within the administration server 610. The watch rules can be configured to use a variety of data points, such as runtime metrics from server and domain runtime MBean servers as well as log records and instrumentation events. Rule expression can use EL (expression language) syntax and when evaluated, return a Boolean value. When a true value is returned by the rules 623, an associated action 624 can be triggered. The triggered action 624 can be associated with the elastic service manager in certain situations, and in turn the elastic service 631, such as when the triggered action is a scaling operation in the dynamic cluster 760.

For example, as depicted in FIG. 7, the diagnostic framework can, via watch rules, determine that the resources provided by the dynamic cluster (e.g., heap, threads) are being wasted (i.e., the dynamic cluster is providing an excess of compute resources), or that the demands put on the dynamic cluster by partitions A and B are minimal. In such situations, the watch rule returns a value of true, and the associated action is a scale down operation. The scale down operation is then triggered within the elastic service manager, which provides the scale down elastic service. The scale down operation 740 is then triggered at the dynamic cluster, which can stop managed server N (as indicated by the shading in the figure).

Rule-Based Elasticity—Interceptor Framework

A problem can arise in an application server environment employing a rule-based elasticity framework where the rules and actions allow for scaling operations within a dynamic cluster. Starting, adding, stopping or removing server instances in a cluster (i.e., scale-up and/or scale-down) is an aspect of a potential issue. Changing cluster sizes can affect other parts of the application server, and in some cases may also impact other layers in the system.

For example, in accordance with an embodiment, increasing the cluster size may result in large number of additional connections, such as JDBC (Java Database Connectivity), to be created, which can potentially overwhelm database capacity. Similarly, while scaling down, it may be necessary to coordinate with other application server subsystems so that work in progress has a chance to complete before the managed server is shut down. Additionally, it may be necessary to coordinate with a front-end (e.g., a traffic director, such as the Oracle Traffic Director) tier when new managed servers are added to the cluster during scale-up and removed during scale-down. Also, end users may potentially have customized interactions in order to interact with third party systems (e.g., virtualization managers and the like) and may need hooks to integrate with the elastic cluster management. Accordingly, an interceptor can provide the various other components of a system hooks related to a scaling operation before and after the scaling operation.

Figure 8:
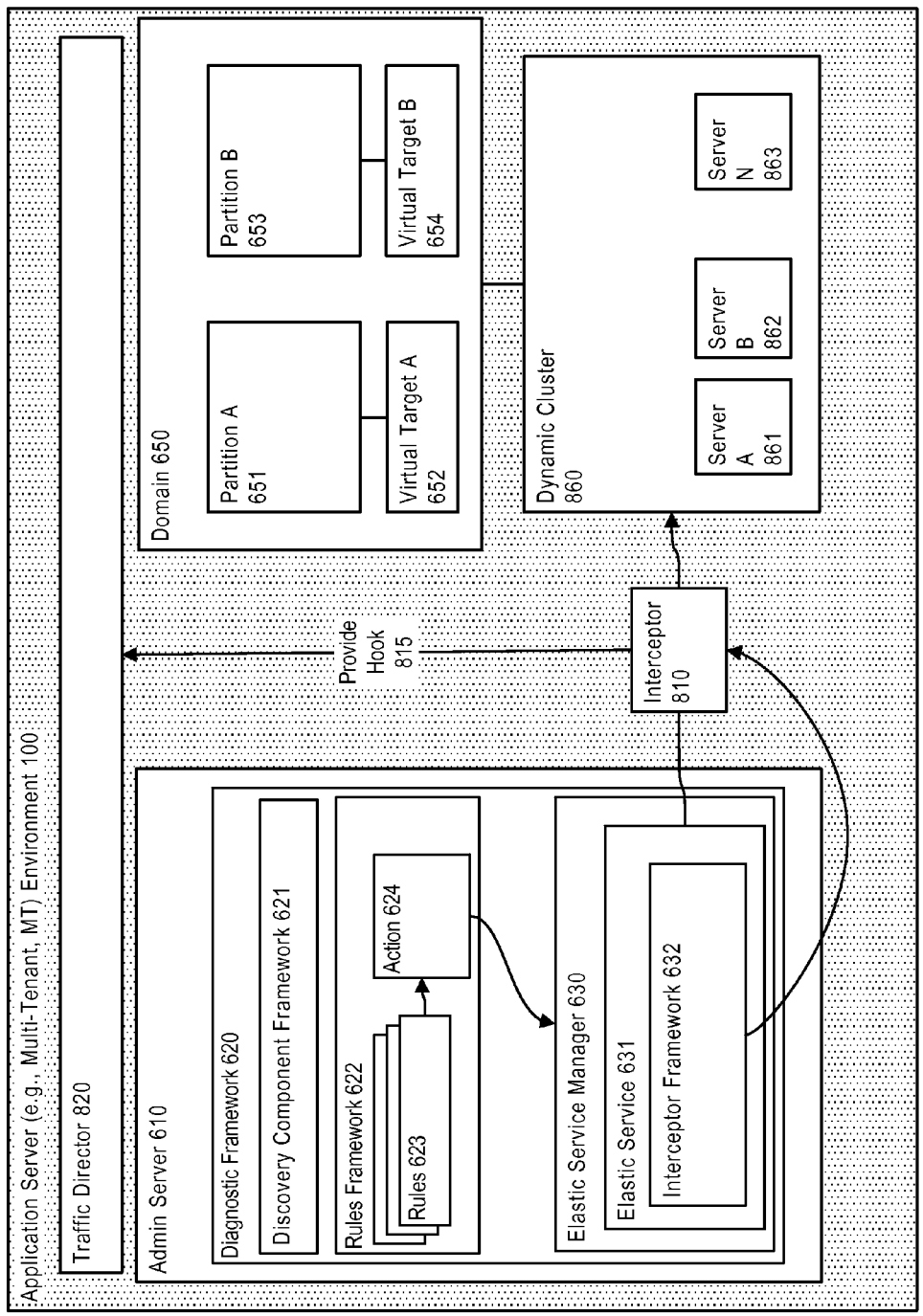
FIG. 8 illustrates rule-based elasticity within an application server environment, in accordance with an embodiment.

FIG. 8 illustrates rule-based elasticity within an application server environment, in accordance with an embodiment. More particularly, FIG. 8 illustrates the use of an interceptor framework within an application server environment during a rule-based elasticity scaling operation. As shown in the figure, an application server environment 600, such as a multitenant application server environment, can include an administration server 610, a domain 650, a dynamic cluster 860, and a traffic director 820. The administration server 610 can include a diagnostic framework 620. In accordance with an embodiment, the diagnostic framework can be a WebLogic Diagnostic Framework. The diagnostic framework 620 can include a discovery component framework 621, a rules framework 622, and an elastic service manager 630. The rules framework 622 can include a number of rules 623 and an action module 624. The elastic service manager 630 can include an elastic service 631, which in turn can include an interceptor framework 632. The domain 650 can include partitions A and B, 651 and 653 respectively. Partitions A and B can be, respectively, associated with virtual targets A and B, 652 and 654 respectively. The dynamic cluster 860 can include a number of running managed servers, such as managed server A 861, managed server B 862, and managed server N 863.

In accordance with an embodiment, the diagnostic framework can contain, among the rules 623, watch rules associated with the diagnostic framework that can be run within the administration server 610. The watch rules can be configured to use a variety of data points, such as runtime metrics from server and domain runtime MBean servers as well as log records and instrumentation events. Rule expression can use EL (expression language) syntax and when evaluated, return a Boolean value. When a true value is returned by the rules 623, an associated action 624 can be triggered. The triggered action 624 can be associated with the elastic service manager in certain situations, and in turn the elastic service 631, such as when the triggered action is a scaling operation (scale up/scale down) in the dynamic cluster 860.

In accordance with an embodiment, upon the signaling of a scaling action, an interceptor framework 632 can provide an interceptor 810 in order to provide hooks 815 for other components of the system, such as the traffic director 820 (e.g., Oracle Traffic Director), to intercept the scaling operation so the other components of the system components can prepare for and/or react to (and possibly veto) the scaling operation (such as, for example, currently processing transactions).

For example, as depicted in FIG. 8, the diagnostic framework can, via watch rules, determine that the resources provided by the dynamic cluster (e.g., heap, threads) are being wasted and/or are insufficient for the current demands by partitions A and B. In such situations, the watch rule returns a value of true, and the associated scaling action can be called. Before being implemented at the dynamic cluster, the scaling action can be intercepted by interceptor 810, provided by the interceptor framework 632. The interceptor can provide hooks 815 to the traffic director 820 before and after the scaling operation to ensure there are, for example, no interruptions in service. Such an interceptor can allow for assurances that the traffic director is informed of any new servers coming online, or currently running servers being taken offline.

Rule-Based Elasticity—Tuning

Figure 9:
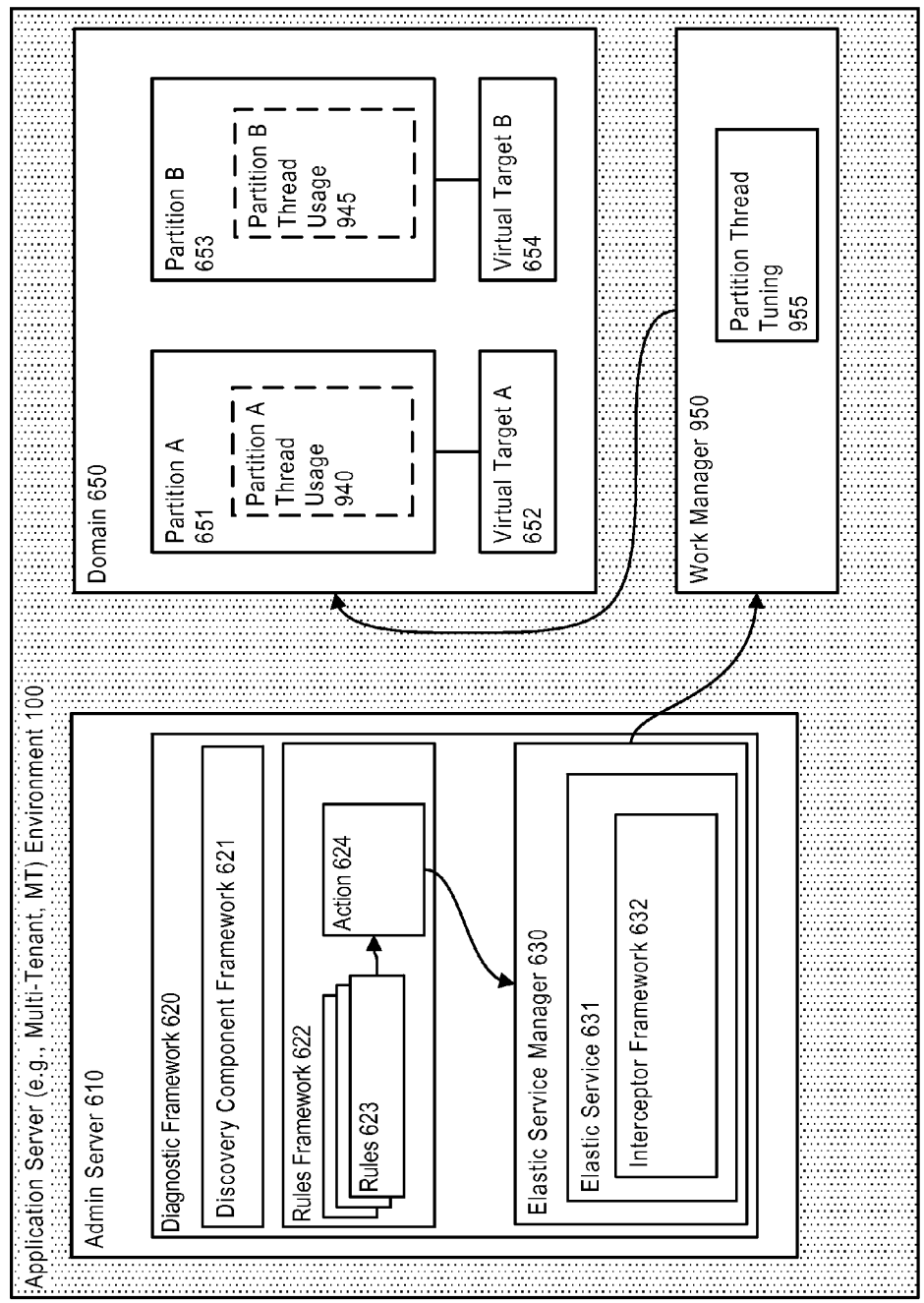
FIG. 9 illustrates rule-based elasticity within an application server environment, in accordance with an embodiment.

FIG. 9 illustrates rule-based elasticity within an application server environment, in accordance with an embodiment. More particularly, FIG. 9 illustrates rule-based tuning, based upon rule-based elasticity, within an application server environment. As shown in the figure, an application server environment 600, such as a multitenant application server environment, can include an administration server 610, a domain 650, and a work manager 950. In certain embodiments, the work manager can be a partition work manager.

The administration server 610 can include a diagnostic framework 620. In accordance with an embodiment, the diagnostic framework can be a WebLogic Diagnostic Framework. The diagnostic framework 620 can include a discovery component framework 621, a rules framework 622, and an elastic service manager 630. The rules framework 622 can include a number of rules 623 and an action module 624. The elastic service manager 630 can include an elastic service 631, which in turn can include an interceptor framework 632. The domain 650 can include partitions A and B, 651 and 653 respectively. Partitions A and B can be, respectively, associated with virtual targets A and B, 652 and 654 respectively. Partitions A and B can respectively be associated with partition A thread usage 940 and partition B thread usage 945. The work manager 950 can include a number of a partition thread tuning module 955.

In accordance with an embodiment, the diagnostic framework can contain, among the rules 623, watch rules associated with the diagnostic framework that can be run within the administration server 610. The watch rules can be configured to use a variety of data points, such as runtime metrics from server and domain runtime MBean servers as well as log records and instrumentation events. Rule expression can use EL (expression language) syntax and when evaluated, return a Boolean value. When a true value is returned by the rules 623, an associated action 624 can be triggered. The triggered action 624 can be associated with the elastic service manager in certain situations, and in turn the elastic service 631, such as when the triggered action is a tuning operation in the work manager 950.

For example, as depicted in FIG. 9, the diagnostic framework can provide a calendar watch rule, which can provide a schedule to check the varying workloads associated with partitions A and B during periodic, pre-defined intervals and/or at certain times of day. For example, during a certain time of day, it may be known that partition A is expected to have reduced traffic, while partition B is expected to have increased processing needs. In such situations, upon the calendar watch rule signaling true, an elastic service action can be triggered that will adjust the partition thread tuning module in the work manager to decrease the threads allocated to partition A and increase the number of threads allocated to partition B.

Rule-Based Elasticity Method

Figure 10:
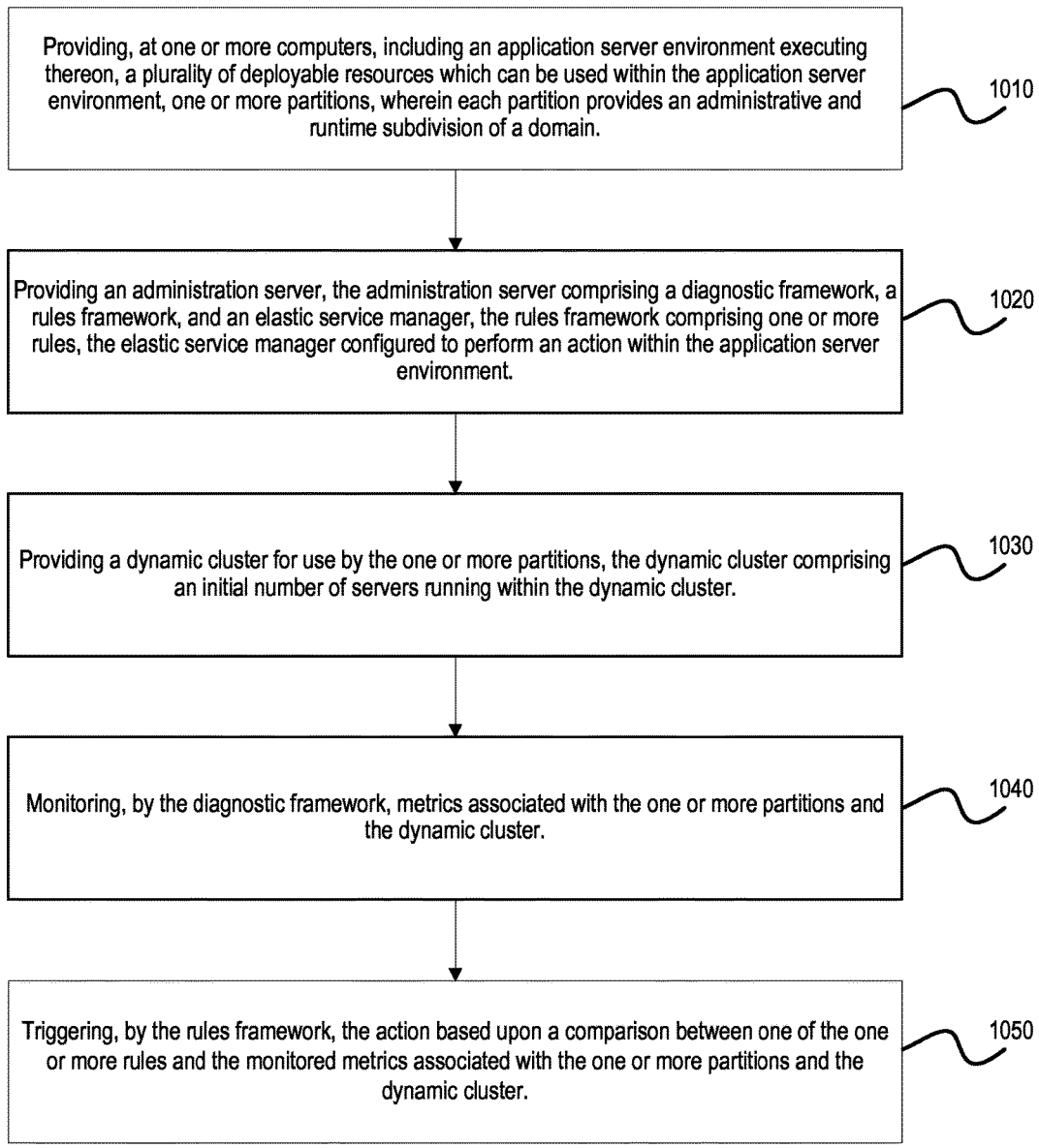
FIG. 10 illustrates, via a flow chart, a method for rule-based elasticity support within an application server environment, in accordance with an embodiment.

FIG. 10 illustrates, via a flow chart, a method for rule-based elasticity support within an application server environment, in accordance with an embodiment. An exemplary method can begin at step 1010 with providing, at one or more computers, including an application server environment executing thereon, a plurality of deployable resources which can be used within the application server environment, one or more partitions, wherein each partition provides an administrative and runtime subdivision of a domain. At step 1020, the method can provide an administration server, the administration server comprising a diagnostic framework, a rules framework, and an elastic service manager, the rules framework comprising one or more rules, the elastic service manager configured to perform an action within the application server environment. At step 1030, the method can provide a dynamic cluster for use by the one or more partitions, the dynamic cluster comprising an initial number of servers running within the dynamic cluster. The method can then, at step 1040, monitor by the diagnostic framework, metrics associated with the one or more partitions and the dynamic cluster (e.g., metrics associated with the managed servers within the dynamic cluster). Finally, the method can trigger, at step 1050, by the rules framework, the action based upon a comparison between one of the one or more rules and the monitored metrics associated with the one or more partitions and the dynamic cluster.

WebLogic—Watch and Notification Enhancements

In accordance with an embodiment, the present disclosure can be executed in the context of a WebLogic application server. Within WebLogic, WLDF Watch and Notification (W&N) can be enhanced in order to support the above disclosure. These enhancements can include: support for Java EL expressions as the language for Watch rules (Collected metrics, Log, and Instrumentation event rules); support for calendar-based schedules for rule evaluations; provide an extensible framework to allow custom functions to be discovered at runtime and utilized within WLDF W&N EL expressions, as well as metadata about those functions and their parameters; provide extensible framework to allow actions to be written by third parties that can be discovered, for example, at the discovery component framework provided by HK2, at runtime and utilized within WLDF W&N EL expressions, as well as metadata about those actions and their properties; provide an extensible framework to allow custom bean objects to be discovered at runtime and utilized within WLDF W&N EL expressions, as well as metadata about those beans and their attributes and operations; provide an extensible framework to write a set of parameterized rules, or "Smart Rules", that can be discovered at runtime and utilized within WLDF EL expressions, as well as metadata about those rules and their parameters; provide a set of expression beans for access to existing sources of WLDF RuntimeMBean metrics (WLS Beantree, ServerRuntime MBeanServer, and DomainRuntime MBeanServer); provide a base set of functions for common operations with metric data, and for retaining a set of metrics with history; provide the ability to execute a rule, or portions of a rule, remotely; and provide an action that can execute a WLST script, or script snippet.

In accordance with an embodiment, watch rule enhancements can be provided. In order to support more flexible and powerful expressions, WLDF can adopt Java EL as the language for watch rule expressions. Java EL is standards based, and provides a flexible and extensible framework upon which to build a larger set of functionality. Using the ELContext class and the HK2 framework, WLDF can provide an extensible framework that allows third parties to plug in custom functions, beans, and metric sources in watch rule expressions.

WebLogic—Pluggable Actions Framework

In accordance with an embodiment wherein the present disclosure is implemented in the context of a WebLogic application server, WLDC can have an internal set of notifications that take actions when a watch rule expression is triggered. Previously, these primarily included the ability to send out notifications over different messaging transports (SMTP, JMS, JMX, and SNMP), as well as the ability to capture a diagnostic image on the local server. These notifications can be expanded to a more general action, and provide a framework for external actions to be developed.

In accordance with an embodiment, the pluggable actions framework can support defining an action that can be discovered and managed at runtime via HK2. The pluggable actions framework can also support defining a custom configuration bean, with validation, that WLDF can map to a generic configuration bean of its own. The framework can optionally support defining a set of WLST functions for management of the action type.

In accordance with an embodiment, at runtime, a configured action can be associated with a WLDF watch rule instance. When the rule is triggered, the action instance can be invoked with a context object containing information about the watch rule that is invoking it, and the data that cause the rule to trigger.

In accordance with an embodiment, in order to implement an action for use within the WLDF W&N framework, a developer can do the following. The developer can define a class that implements the WLDF-defined #Action HK2 contract, where the service-name acts as the action-type key. The developer can then define a configuration JavaBean that implements the #ActionConfigBean HK2 contract, where the service name is the same as the Action implementation service name. This bean can use JSR 349 constraint annotations for field value validations.

The #Action interface, in accordance with an embodiment, can allow the implementation of logic the action when it is invoked, via the execute(ActionContext) method. The interface can also allow for the implementation of logic to cancel an action execution in the event of, for example, an action timeout, by implementing a cancel( ) method. The #ActionContext instance can provide a map object containing the values (and the source path to those values) that caused the rule to be triggered. The W&N framework can evaluate a watch rule, and when the rule is triggered, create an ActionContext and invoke the actions associated with the rule.

A developer can, according to an embodiment, define a configuration bean for an Action as an HK2 service that implements the contract #ActionConfigBean. When looking for the configuration bean class associated with an action implementation, the #ActionsManager can look up the configuration bean service using the same HK2 service name.

In accordance with an embodiment, an instance of an action configuration can be stored in the WLDFWatchNotificationBean element of the WLDFResourceBean using a WLS descriptor bean, such as, for example, #WLDFActionBean. This bean can contain the instance name of the action configuration, the action type name (mapped to an HK2 service name), and a properties map, the properties map having name/value pairs for the corresponding fields on the target ActionConfigBean.

When an action instance is created at runtime, according to an embodiment, the W&N framework can lookup an instance of the corresponding ActionConfigBean bean via HK2 using action type name. The framework can then populate the configuration bean instance, mapping the keys in the properties map of WLDFActionBean to fields on the configuration bean using JavaBean conventions, coercing the value to the expected type. The framework can then validate the ActionConfigBean using a JSR 349 Bean Validation API. Finally, the framework can obtain an action instance using the validated ActionConfigBean instance via an ActionsManager service.

Similarly, in accordance with an embodiment, when creating a new action bean configuration within a WLDF resource, the ActionConfigBean can be used to validate inputs, and then reverse-map fields to the WLDFActionBean properties map in the following manner. If a field is a simple type, a Map, List, Set, or an array type, the non-localized field name can be a key in the WLDFActionBean properties map. For simple types, the value can be stored as the stringified value of the attribute. For attributes that are a list type, a set, or array type, the values can be stored as a comma-separated list of stringified values. Map attributes can be stored as a comma-separated list of name/value pairs (e.g., of the form "key1=value1,key2=value2, . . . "); the key can be assumed to be of the type java.lang.String.

For attributes that are one of the supported collection classes, if it is a concrete class, the W&N framework can attempt to instantiate an instance of that type and populate it. If it is declared as one of the base interface types (List, Set, or Map), the framework can choose an implementation of that type to create and populate; in those cases the bean implementation may not make assumptions of the actual collection type being passed in.

For the leaf values of attributes that are of supported collection types, the W&N framework can determine the target primitive type to convert a value to based on an actual generic parameter of the target attribute on the ActionConfigBean class. If the type cannot be determined, the value can be stored as a string. For Map objects, the W&N framework can use the actual generic parameter for the value type.

What follows is an exemplary action config bean example:

```
/**
* Test action config, demonstrating the supported attribute types.
*/
@Service(name=WatchTestAdminServerAction.ADMIN_ACTION_NAME)
@PerLookup
public class WatchTestAdminServerActionConfigBean extends
ActionConfigBeanAdapter
implements ActionConfigBean {
...
/**
* Simple int attribute.
* @return
*/
@Max(100)
public int getIntVal( ) { ... }
/**
* Simple int attribute.
*/
public void setIntVal(int intVal) { ... }
/**
* Simple long attribute.
* @return
*/
@Min(5)
public long getLongVal( ) { ... }
/**
* Simple
*/
public void setLongVal(long longVal) { ... }
/**
* Simple String attribute.
* @return
*/
@NotNull
public String getStringVal( ) { ... }
/**
* Simple String attribute.
*/
public void setStringVal(String stringVal) { ... }
/**
* Long array attribute.
* @return
*/
public long[ ] getLongArray( ) { ... }
/**
* Long array attribute.
*/
public void setLongArray(long[ ] longArray) { ... }
/**
* String array attribute.
* @return
*/
public String[ ] getStringArray( ) { ... }
/**
* String array attribute.
*/
```

```
public void setStringArray(String[ ] stringArray) { ... }
/**
* Concrete List-type (String).
* @return
*/
public ArrayList<String> getStringList( ) { ... }
/**
* Concrete List-type (String).
*/
public void setStringList(ArrayList<String> stringList) { ... }
/**
* Concrete Set-type (String).
* @return
*/
public HashSet<String> getStringSet( ) { ... }
/**
* Concrete Set-type (String).
*/
public void setStringSet(HashSet<String> stringSet) { ... }
/**
* Concrete List-type (Long).
* @return
*/
public ArrayList<Long> getLongList( ) { ... }
/**
* Concrete List-type (Long).
*/
public void setLongList(ArrayList<Long> longList) { ... }
/**
* Abstract List-type (Long).
* @return
*/
public List<Long> getList( ) { ... }
/**
* Abstract List-type (Long).
*/
public void setList(List<Long> longList) { ... }
/**
* Abstract Set-type (Long).
* @return
*/
public Set<Long> getSet( ) { ... }
/**
* Abstract Set-type (Long).
*/
public void setSet(Set<Long> longSet) { ... }
/** Abstract Map-type (String, Long).
* @return
*/
public Map<String, Long> getLongValueMap( ) { ... }
/**
* Abstract Map-type (String, Long).
*/
public void setLongValueMap(Map<String, Long> logValueMap) { ... }
/**
* Concrete Map-type (String, String).
* @return
*/
public ConcurrentHashMap<String, Integer> getIntValueMap( ) { ... }
/**
* Concrete Map-type (String, String).
*/
public void setIntValueMap)(ConcurrentHashMap<String, Integer> intValueMap) { ... }
}
```

WebLogic—Smart Rules

In accordance with an embodiment, watch rules can specify a rule expression which provides a condition under which the watch fires (i.e., issues a true value and triggers an action). The rule expression can be an EL expression. A user can configure complex expressions based on available metrics and using EL constructs. However, an administrator may require considerable low level knowledge to configure such rules. Smart rules can combine the powerful expressions employed through EL, while maintaining a simplicity desired by administrators. Smart rules can hide low level details from the user/administrator so the user/administrator can specify rules components at high level.

Smart rules can be, in accordance with an embodiment, pre-packaged predicates which can have a number of configurable parameters. When evaluated, the smart rules can return a result as a Boolean. A smart rule can provide meta-data for the rule as well as associated parameters so that graphical user interface and other tools can surface the smart rules appropriately. Smart rule meta-data can contain: short name and long name; description (to explain the smart rule's function); and parameters and respective meta-data (e.g., name, description, type, constraints).

In accordance with an embodiment, a smart rule implementation can hide internal details about the rule (such as which low level metrics will be used by the smart rule), how the metrics will be used, etc. A user can select a smart rule to be used based on its high level function and, subsequently, provide the desired parameters as set by the rule. Typical parameters can be threshold values to be used in internal computations, and the like.

For example, a "Requests backlog" smart rule can be created for checking if a certain percentage of servers within a dynamic cluster where the average message backlogs over the last N minutes have exceeded specified threshold. While using the rule, a user/administrator could provide parameters, as prompted by the smart rule. These parameters could include, but are not limited to, cluster name, a duration over which the metrics averages will be computed, a frequency of metrics collection, a message backlog threshold, and a fraction of servers in the cluster where backlog must exceed specified threshold so the watch rule will fire (i.e., produce a Boolean). The implementation of such a smart rule can be responsible for looking up appropriate metric from cluster members, sampling them over an interval, computing averages, performing threshold comparisons and reporting if percentage of servers within the cluster where the average backlog exceeds the threshold. As such, a user can be concerned only with its overall functional aspect, and not its internal details.

In accordance with an embodiment, smart rules can be configured multiple times to, for example, check different clusters with different settings. For example, multiple instances of the above described smart rule may be configured to check message backlogs on different clusters, possibly with different threshold and percentage values.

In accordance with an embodiment, a library of smart rules can be provided. At runtime, available smart rules can be discovered as HK2 objects. Smart rules may be authored independently and incrementally. A user/administrator can use a smart rule from the library by configuring an instance of it. Multiple instances of the same smart rule may be configured with different parameters.

Each smart rule instance, in accordance with an embodiment, can be registered with the W&N framework (along with cluster-name and ruleName). By registering each smart rule instance, this allows smart rules to be used as building blocks in watch rule expressions. In the simplest cases, for example, smart-rule instances can be used as by themselves. The smart rule instances can also be combined with other smart rule instances as well as other EL constructs to form more complex expressions.

WebLogic—Rule-Based Elasticity Scaling

In accordance with an embodiment, after a policy (a watch rule combined with an associated action) triggers, WLDF can, if the action is scaling action, initiate a scale up or scale down action.

To scale up a cluster, an action can call a RuntimeManager.scaleUp(clusterName, scaleFactor, payload) method. This first parameter is the name of the cluster to be scaled, the second parameter specifies the factor by which the service must be scaled down, and the last parameter can contain any data that needs to be passed from action to the service itself. For example, the payload could contain the name(s) of the instance(s) to be scaled up.

To scale down, the action can call a RuntimeManager.scaleDown(clusterName, scaleFactor, payload) method. Within this method, the first parameter is the name of the cluster to be scaled, the second parameter specifies the factor by which the service is to be scaled down, and the last parameter contains any data that should to be passed from action to the service itself. For example, the payload could contain the name(s) of the instance(s) to be scaled down.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for rule-based elasticity support in an application server environment, comprising:
one or more computers, including an application server that enables deployment and execution of software applications, wherein the application server is associated with a domain configuration that is used at runtime to define a domain for execution of said software applications, and a plurality of partitions,
wherein each of the plurality of partitions are associated with a partition configuration, wherein each partition provides a subdivision of the domain and includes one or more resource groups, and wherein each of the plurality of partitions are associated with a virtual target of a plurality of virtual targets;

an administration server, the administration server comprising a diagnostic framework, a rules framework, and an elastic service manager, the rules framework comprising one or more rules, the elastic service manager configured to perform an action within the application server environment;
a dynamic cluster for use by the plurality of partitions, the dynamic cluster comprising an initial number of servers running within the dynamic cluster, the dynamic cluster providing a plurality of threads for use by the plurality of partitions;
an interceptor framework, the interceptor framework providing an interceptor prior to the performance of the action; and
a work manager, the work manager comprising a partition thread tuning module;
wherein the diagnostic framework is configured to monitor thread usage associated with each of the plurality of partitions within the dynamic cluster;
wherein the rules framework is configured to trigger the action based upon a comparison between one of the one or more rules and the monitored thread usage associated with each of the plurality of partitions; and
wherein the triggered action is a tuning action, the tuning action modifying a number of threads of the plurality of threads available to at least a first partition of the plurality of partitions.

2. The system of claim 1, wherein the triggered action further comprises a scale up action or a scale down action, the scale up action starting at least one managed server within the dynamic cluster, the scale down action stopping at least one managed server within the dynamic cluster.

3. The system of claim 1, wherein the one or more rules comprise at least one of the group of rules consisting of watch rules, smart rules, and calendar rules.

4. The system of claim 2, further comprising:
a front end traffic director;
wherein the interceptor, provided by the interceptor framework, provides a hook to the front end traffic director, wherein the hook allows the front end traffic director to delay performance of the action until a condition is met.

5. The system of claim 4, wherein the interceptor framework is further configured to provide another interceptor after the triggered action based upon a comparison between one of the one or more rules and the monitored metrics associated with the plurality of partitions is completed.

6. The system of claim 1, wherein the application server environment comprises a multi-tenant application server environment, and wherein the system can associate the plurality of partitions with a tenant, for use by the tenant.

7. A method for rule-based elasticity support in an application server environment, comprising:
providing, at one or more computers, including an application server that enables deployment and execution of software applications, wherein the application server is associated with a domain configuration that is used at runtime to define a domain for execution of said software applications,
a plurality of partitions, wherein each of the plurality of partitions are associated with a partition configuration, where each partition provides a subdivision of the domain and includes one or more resource groups, and wherein each of the plurality of partitions are associated with a virtual target of a plurality of virtual targets,
an administration server, the administration server comprising a diagnostic framework, a rules framework, and an elastic service manager, the rules framework comprising one or more rules, the elastic service manager configured to perform an action within the application server environment,
a dynamic cluster for use by the plurality of partitions, the dynamic cluster comprising an initial number of servers running within the dynamic cluster, the dynamic cluster providing a plurality of threads for use by the plurality of partitions,
an interceptor framework, the interceptor framework providing an interceptor prior to the performance of the action, and
a work manager, the work manager comprising a partition thread tuning module;
monitoring, by the diagnostic framework, thread usage associated with each of the plurality of partitions within the dynamic cluster; and
triggering, by the rules framework, the action based upon a comparison between one of the one or more rules and the monitored thread usage associated with each of the plurality of partitions,
wherein the triggered action is a tuning action, the tuning action modifying a number of threads of the plurality of threads available to at least a first partition of the plurality of partitions.

8. The method of claim 7, wherein the triggered action further comprises a scale up action or a scale down action, the scale up action starting at least one managed server within the dynamic cluster, the scale down action stopping at least one managed server within the dynamic cluster.

9. The method of claim 7, wherein the one or more rules comprise at least one of the group of rules consisting of watch rules, smart rules, and calendar rules.

10. The method of claim 8, further comprising:
further providing, at the one or more computers, a front end traffic director;
wherein the interceptor, provided by the interceptor framework provides a hook to the front end traffic director, wherein the hook allows the front end traffic director to delay performance of the action until a condition is met.

11. The method of claim 10, further comprising:
providing, via the interceptor framework, another interceptor after the triggered action based upon a comparison between one of the one or more rules and the monitored metrics associated with the plurality of partitions is completed.

12. The method of claim 7, wherein the application server environment comprises a multi-tenant application server environment, and wherein the system can associate the plurality of partitions with a tenant, for use by the tenant.

13. A non-transitory computer readable storage medium, including instructions stored thereon for rule-based elasticity support in an application server environment which when read and executed by one or more computers cause the one or more computers to perform steps comprising:
providing, at one or more computers, including an application server that enables deployment and execution of software applications, wherein the application server is associated with a domain configuration that is used at runtime to define a domain for execution of said software applications,
a plurality of partitions, wherein each of the plurality of partitions are associated with a partition configuration, where each partition provides a subdivision of the domain and includes one or more resource groups, and wherein each of the plurality of partitions are associated with a virtual target of a plurality of virtual targets, an administration server, the administration server comprising a diagnostic framework, a rules framework, and an elastic service manager, the rules framework comprising one or more rules, the elastic service manager configured to perform an action within the application server environment, a dynamic cluster for use by the plurality of partitions, the dynamic cluster comprising an initial number of servers running within the dynamic cluster, the dynamic cluster providing a plurality of threads for use by the plurality of partitions, an interceptor framework, the interceptor framework providing an interceptor prior to the performance of the action, and a work manager, the work manager comprising a partition thread tuning module;

monitoring, by the diagnostic framework, thread usage associated with each of the plurality of partitions within the dynamic cluster; and triggering, by the rules framework, the action based upon a comparison between one of the one or more rules and the monitored thread usage associated with each of the plurality of partitions, wherein the triggered action is a tuning action, the tuning action modifying a number of threads of the plurality of threads available to at least a first partition of the plurality of partitions.

14. The non-transitory computer readable storage medium of claim 13, wherein the triggered action further comprises a scale up action or a scale down action, the scale up action starting at least one managed server within the dynamic cluster, the scale down action stopping at least one managed server within the dynamic cluster.

15. The non-transitory computer readable storage medium of claim 13, wherein the one or more rules comprise at least one of the group of rules consisting of watch rules, smart rules, and calendar rules.

16. The non-transitory computer readable storage medium of claim 14, the steps further comprising:

further providing, at the one or more computers, a front end traffic director;

wherein the interceptor, provided by the interceptor framework provides a hook to the front end traffic director, wherein the hook allows the front end traffic director to delay performance of the action until a condition is met.

17. The non-transitory computer readable storage medium of claim 13, the steps further comprising:

providing, via the interceptor framework, another interceptor after the triggered action based upon a comparison between one of the one or more rules and the monitored metrics associated with the plurality of partitions is completed.

* * * * *